United States Patent [19]
Gerstel et al.

[11] Patent Number: 5,867,289
[45] Date of Patent: Feb. 2, 1999

[54] FAULT DETECTION FOR ALL-OPTICAL ADD-DROP MULTIPLEXER

[75] Inventors: Ornan Alexander Gerstel, Riverdale; Chung-Sheng Li; Rajiv Ramaswami, both of Ossining; Chaoyu Yue, North Tarrytown, all of N.Y.

[73] Assignee: International Business Machines Corporation, Armonk, N.Y.

[21] Appl. No.: 772,789

[22] Filed: Dec. 24, 1996

[51] Int. Cl.$^6$ .............................. H04B 10/08; H04J 14/02
[52] U.S. Cl. ........................... 359/110; 359/127; 359/128
[58] Field of Search .................... 359/110, 117, 359/127, 128, 133, 161, 177

[56] References Cited

U.S. PATENT DOCUMENTS

| | | | |
|---|---|---|---|
| 5,321,541 | 6/1994 | Cohen | 359/127 |
| 5,335,104 | 8/1994 | Johnson | 359/110 |
| 5,546,483 | 8/1996 | Inoue et al. | 359/110 |

*Primary Examiner*—Leslie Pascal
*Attorney, Agent, or Firm*—Ratner & Prestia

[57] ABSTRACT

A fault detecting apparatus and method for a network node of an optical transmission system receives a wavelength division multiplexed (WDM) optical signal which includes a group of optical channels. The network node includes an optical demultiplexer, optical switch, optical multiplexer, and an optical channel add/drop device. Supervisory optical signals having a different wavelength than the wavelengths of the group of optical channels are generated and spliced with each optical channel by the optical demultiplexer. The supervisory channel optical power is tapped off at various points in the network node, such as the output optical channels of the demultiplexer, dropped optical channel outputs, output optical channels from the optical switch, and the output WDM optical signal of the multiplexer. The supervisory channels are monitored by a wavemeter for bypass lightpaths and dropped lightpaths. Added optical channels are monitored by monitoring a portion of the signal power in the added lightpath of the added optical channel. If the wavemeter detects the absence of the supervisory signal, or the portion of the added optical channel, this indicates a fault condition and the network control is notified to effect correction of the fault.

20 Claims, 11 Drawing Sheets

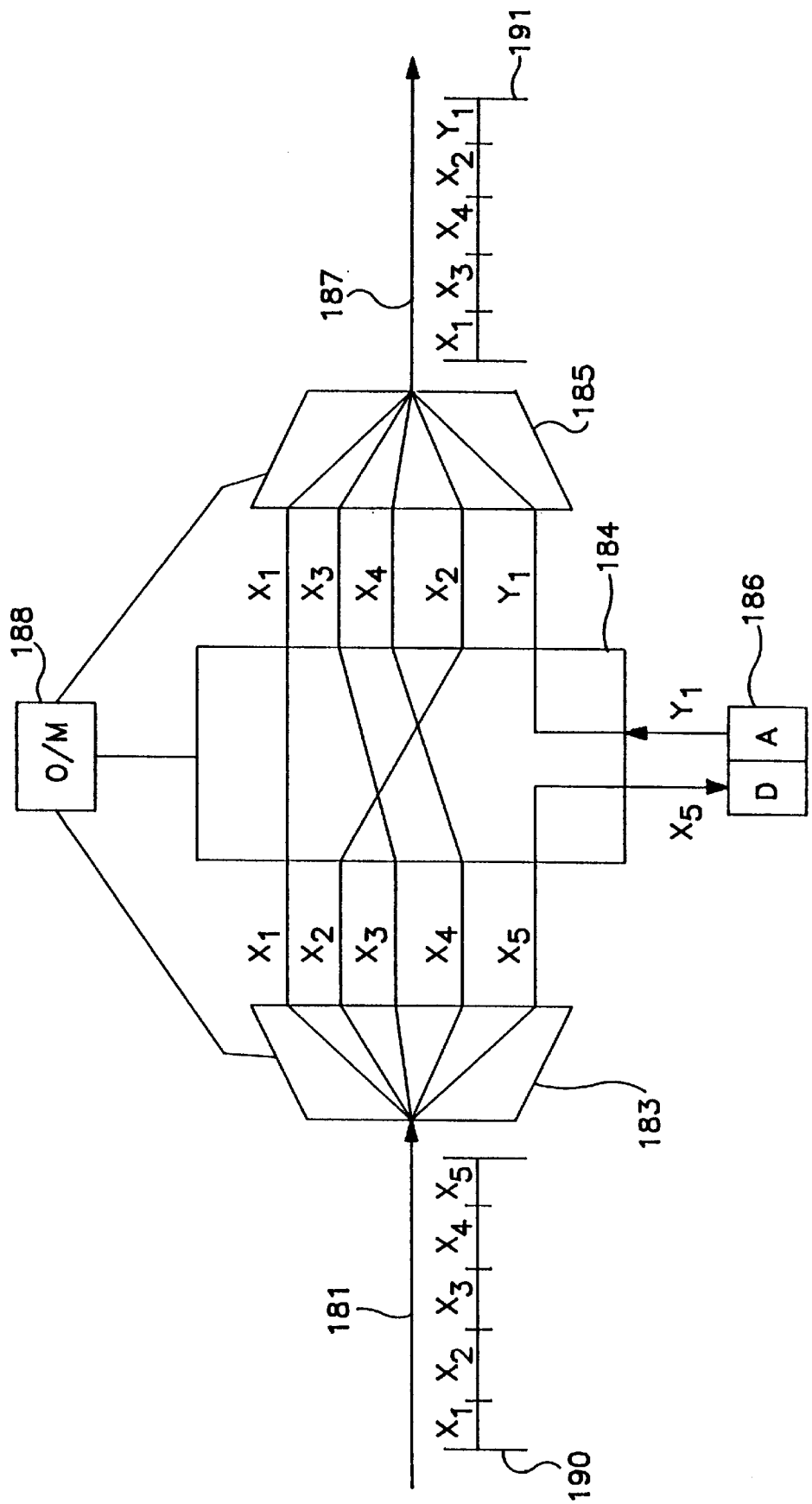
FIG. IB

FAULT DETECTION FOR ALL-OPTICAL ADD-DROP MULTIPLEXER

FIELD OF INVENTION

This invention is related to the detection and isolation of faults in an all-optical add-drop multiplexer, and more particularly to faults within a lightpath through an optical demultiplexer, optical switch, and optical multiplexer.

BACKGROUND OF THE INVENTION

All-optical networks, in which networks nodes are interconnected by single-mode optical fibers, often contain optical demultiplexers, optical switches, and optical multiplexers. Further, network nodes can be interconnected by counter-rotating rings, or in a mesh, ring, or bus topology. In the counter-rotating ring topology an increased network survivability to fiber failure can be achieved. The notion of counter-rotating ring is well-known in the art, and has been widely adopted in, for example, in the Fiber Data Distribution Interconnection (FDDI).

Multiple optical signals at different wavelengths can coexist in these fibers by using Wavelength Division Multiplexing (WDM) techniques. A typical network node of a WDM system includes the functions of demultiplexing a traffic signal, switching channels of the traffic signal to add and drop local channels, and multiplexing the switched channels for transmission. The network node typically includes a controlling unit for operations and maintenance (O/M) functions, and an optical demultiplexer, an optical switch, and an optical multiplexer.

Each optical signal within the network node passes through a number of elements within the optical demultiplexers, optical switch, and optical multiplexers. The optical channel transmission path through these elements is called a lightpath. A failure of the lightpath can occur if an element within the node fails to operate correctly, or fails completely. The element causing the failure can be difficult to locate.

SUMMARY OF THE INVENTION

A fault detecting process generates optical supervisory signals at a predetermined wavelength and combines the supervisory signals with one or more optical signals of differing wavelengths which are multiplexed together. The system includes at least one optical demultiplexer, optical switch, and optical multiplexer. The demultiplexer demultiplexes the optical signals and each demultiplexed optical signal includes a portion of the supervisory signal. The optical signals are then provided to the optical switch, which provides the optical signals to the optical multiplexer, and in some systems an optical channel dropping device. A detector isolates a fault by monitoring the demultiplexed optical signals for the portion of the supervisory signal at the output of the demultiplexer and/or the output of the optical switch and/or the output of the optical multiplexer. The absence of the portion of the supervisory signal for a particular optical signal indicates a fault in the lightpath of the optical signal.

BRIEF DESCRIPTION OF THE DRAWING

These and other features and advantages of the present invention will become apparent from the following detailed description, taken in conjunction with the accompanying drawings, wherein:

FIG. 1B is a block diagram showing typical network node functions of demultiplexing a traffic signal, switching channels of the traffic signal to add and drop local channels, and multiplexing the switched channels for transmission.

DETAILED DESCRIPTION

Figure 1A:
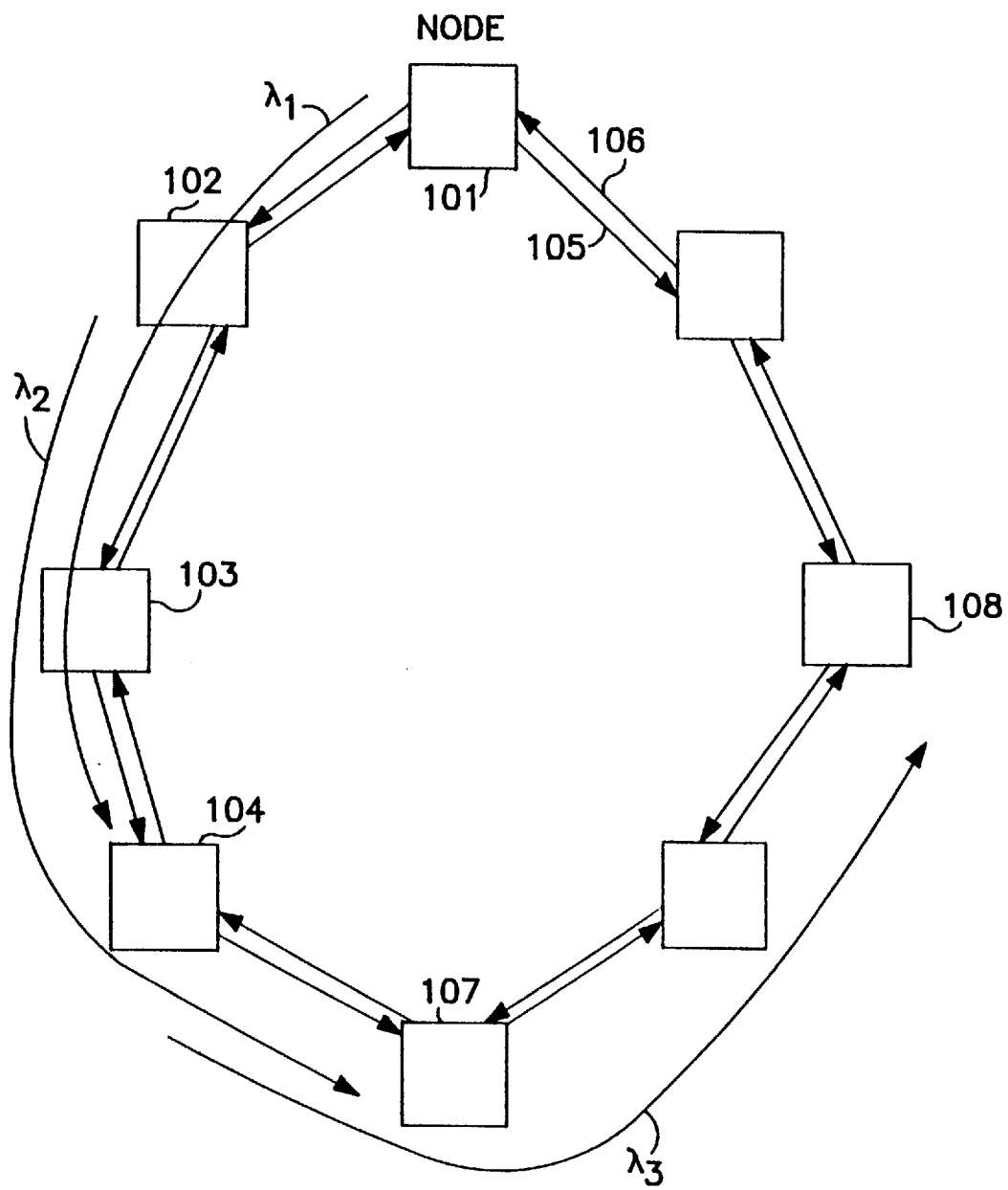
FIG. 1A is a high level diagram of an optical network including network nodes interconnected by counter-rotating rings.

The present invention is generally directed to all-optical networks, in which networks nodes are interconnected by single-mode optical fibers. FIG. 1A is a high level diagram of an optical network including network nodes interconnected by counter-rotating rings. As shown in FIG. 1A, network nodes (101) are interconnected in a ring topology, but these network nodes can also be interconnected in a mesh, star, or bus topology. In the topology shown in FIG. 1A, network nodes are interconnected by counter-rotating rings 105 (for the clockwise direction) and 106 (for the counterclockwise direction), such that an increased network survivability to fiber failure can be achieved. The notion of counter-rotating ring is well-known in the art, and has been widely adopted in, for example, in the Fiber Data Distribution Interconnection (FDDI).

Multiple optical signals at different wavelengths can coexist in these fibers by using Wavelength Division Multiplexing (WDM) techniques. For example, the optical signal at wavelength λ1 is sent from node 101 to node 104, the optical signal at wavelength λ2 is sent from node 102 to 107, while the optical signal at wavelength λ3 is sent from 104 to 108. As a result, two optical signals (at different wavelengths) share the same fiber segment between 102 and 103 in the clockwise direction. Similarly, two wavelengths share the same fiber segment between 104 and 107.

FIG. 1B is a block diagram showing typical network node functions of demultiplexing a traffic signal, switching channels of the traffic signal to add and drop local channels, and multiplexing the switched channels for transmission. The network node typically includes a controlling unit 188 for operations and maintenance (O/M) functions, and a demultiplexer 183, a switch 184, and a multiplexer 185.

The network node usually receives a group of channels, x1, x2, x3, x4, x5, multiplexed on a transmission line 181 in a predetermined format 190, which can be a set of optical signals with corresponding wavelengths in an optical system. The demultiplexer 183 splits the received transmission line 181 into separate channels x1, x2, x3, x4, x5, which are received by the switch 184. The local node usually receives information on one or more channels, x5, from the transmission line 181, and returns information to other nodes through one or more channels, y1. Consequently, the switch "drops" the channel x5 to the Drop/Add unit 186, and receives the local channel y1 from the Drop/Add unit 186 as an "added" channel. The switch 184 rearranges the received channels x1, x2, x3, x4, and y1, which is, for example, accomplished by wavelength conversion in an optical switch, and provides them as output channels x1, x3, x4, x2, and y1 to the multiplexer 185. The multiplexer 185 combines and provides the channels x1, x3, x4, x2, y1 on output transmission line 187 in a predetermined multiplex format 191. The node's controlling unit 188 performs operations and maintenance (O/M) functions related to the demultiplexer 183, switch 184, and multiplexer 185.

Figure 2:
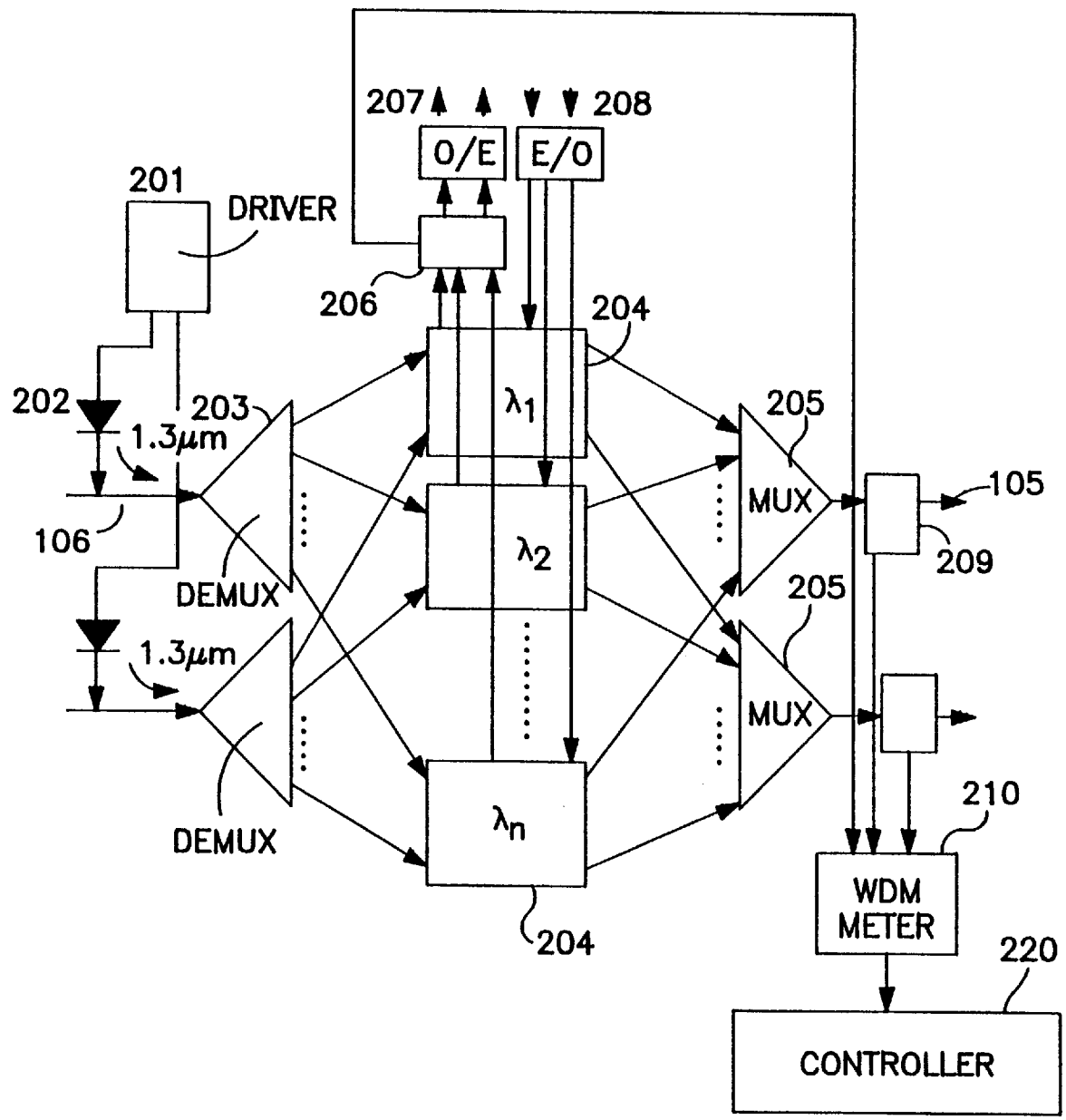
FIG. 2 is a high level diagram of each optical network node in which the present invention may be employed, showing the structure for demultiplexing the incoming optical wavelengths, permuting them through an optical switch, and recombining them through an optical multiplexer.

FIG. 2 is a high level diagram of each optical network node in which the present invention may be employed, showing the structure for demultiplexing the incoming optical wavelengths, permuting them through an optical switch, and recombining them through an optical multiplexer. The demultiplexing, switching and multiplexing system of FIG. 2 as used in optical network nodes 101, 102, 103, 104, 107, 108 implements the network node functions as illustrated in FIG. 1B.

The optical network node includes wavelength demultiplexers 203, optical switch 204, wavelength multiplexers 205, wavelength add ports 208 and wavelength drop ports 207, supervisory channel splitter/combiner 206, supervisory channel monitor 209, and wavemeter 210. The node also includes a supervisory channel generator having a Driver 201 and a Light source 202, and a System Control Unit 220.

The optical network node of FIG. 2 includes an add/drop multiplexer together with its fault monitoring devices and two optical input and output ports. Counter-rotating rings are usually required in order to enhance the fault tolerance and the survivability under disaster.

The incoming optical signal from the single-mode fiber 105 is demultiplexed by wavelength demultiplexers 203 into different output signals each of which has a different wavelength of light, for example, λ1 to λN. Each different wavelength signal is sent to a corresponding optical switch 204, which also receives input signals having the same wavelength from other wavelength demultiplexers. In the exemplary counter-rotating ring embodiment considered here, the optical switch 204 takes two inputs from each of the wavelength demultiplexers 203. Additional inputs are taken from the add ports (208), which are generated locally by the electrical-to-optical converters (E/O of 208) within each node.

Exemplary optical switches can be mechanical, eletrooptic, or acoustooptic, and such devices are well known in the art. Electrical-to-optical converters (E/Os) can be lasers which modulate the optical output signals by the input electrical signals. The output signals of the optical switch are provided to the wavelength multiplexers (205) and the drop ports (207). Wavelength multiplexers are usually structurally similar to wavelength demultiplexers. The drop ports usually consist of, for example, optical-to-electrical converters (O/Es) such as p-i-n photodetectors to convert optical signals to electrical signals.

The following discussion details the preferred embodiment of the invention in which the exemplary embodiment includes optical channels operating with a nominal wavelength of 1.5 $\mu$m and supervisory signals of 1.3 $\mu$m. However, it is contemplated that the process and method of the present invention can be extended to any optical network system employing WDM techniques at other wavelengths in which the supervisory signal has a different wavelength than that of the optical channel signals.

Generation of supervisory signals of one embodiment of the present invention at 1.3 $\mu$m is either accomplished by a Driver 201 and Light Source 202, which can be a broadband high-power light source (such as SLDs) or a tunable laser, and is located at the input port of the demultiplexer 203. Other wavelengths may be used for the supervisory signals. The exemplary optical signals at 1.3 $\mu$m are subsequently combined with the input signal to the input port of the wavelength demultiplexer 203. When a broadband light source is used, the optical signals are spliced by the wavelength demultiplexer and thus be present at all of the output wavelength demultiplexer. The splicing of the optical signals in accordance with one exemplary embodiment of the present invention allows the generation of the supervisory signals for all of the lightpaths at once. In an alternative embodiment, the optical paths are scanned by a tunable laser operating at 1.3 $\mu$m. The supervisory channel uses a wavelength other than 1.5 $\mu$m in order to avoid interfering with signals transmitted at 1.5 $\mu$m.

The wavemeter 210 monitors the supervisory channel, which is tapped off from the output port of the wavelength multiplexer using the device shown in 209, and displays the optical power of each supervisory channel present in each individual wavelength signal simultaneously.

The supervisory channel splitter/combiner 206 is a 1.3/1.55 $\mu$m splitter array placed in front of the optical receiver of the drop port 207 to filter the 1.3 $\mu$m signals. The 1.3 $\mu$m signals are then combined and monitored at the wavemeter.

Figure 3:
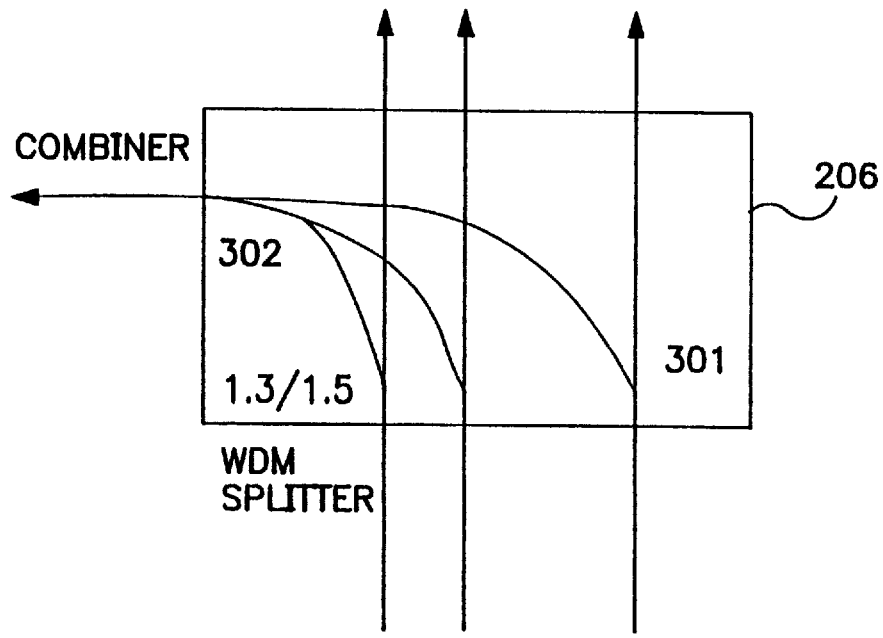
FIG. 3 is a high level diagram of a Wavelength Division Multiplex splitter/combiner which demultiplexes 1.3 μm optical signals from 1.5 mm optical signals and recombines all of the 1.3 mm signals.

FIG. 3 is a high level diagram of a Wavelength Division Multiplex splitter/combiner 206 which taps off each of the 1.3 $\mu$m signals of the supervisory channels from the corresponding 1.5 $\mu$m optical signals and recombines all of the 1.3 $\mu$m signals. Each incoming fiber (or waveguide) is connected to a 1.3 $\mu$m/1.55 $\mu$m WDM splitter so that the optical power at 1.3 $\mu$m is completely tapped off from the 1.55 $\mu$m signal. All of these optical signals are then combined by an optical combiner 302 into a single fiber. Although all of the optical power tapped off is at the 1.3 $\mu$m wavelength from each optical signal, each separate 1.3 $\mu$m signal is still associated with the corresponding optical signal of different wavelength, which is determined by the output of the wavelength demultiplexer. The combining operation multiplexes each of the 1.3 $\mu$m signals together and does not destroy the signal integrity. Each 1.3 $\mu$m signal can always be recovered by a wavelength demultiplexer.

Figure 4:
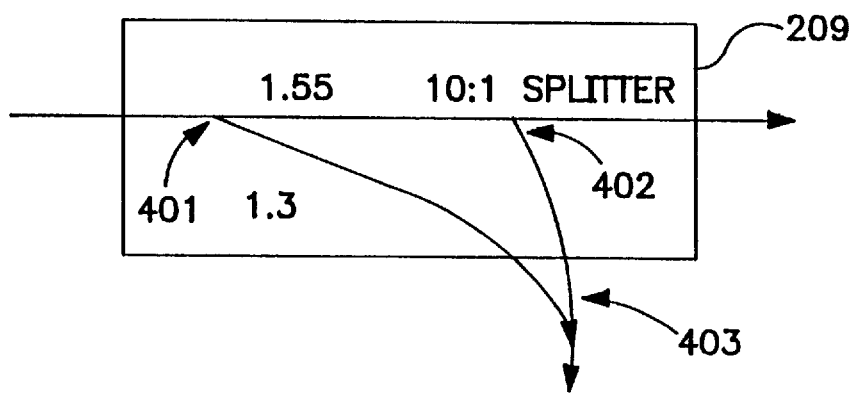
FIG. 4 is a high level diagram of a Wavelength Division Multiplex splitter/combiner, in which all of the 1.3 mm optical signals are demultiplexed while just a portion of the 1.5 mm signals are sampled.

FIG. 4 is a high level diagram of a Wavelength Division Multiplex splitter/combiner 209, in which all of the 1.3 $\mu$m optical signals are demultiplexed while just a portion of the 1.5 $\mu$m signals are sampled. In the splitter/combiner 209, the incoming optical signals are split at 401 into two paths based on the wavelength (whether it is 1.3 $\mu$m or 1.55 $\mu$m). Furthermore, a portion of the optical signal at 1.55 $\mu$m is tapped off at 402. These two signals are combined by an optical combiner at 403.

The Network Node Testing

The testing of the entire add-drop multiplexer occurs during initial power-on and regular operating modes, and the testing encompasses three sub-tests. The first sub-test monitors the presence of bypass lightpaths, the second sub-test monitors the presence of added lightpaths, and the third sub-test monitors the presence of dropped lightpaths.

Bypass Lightpaths

Figure 5:
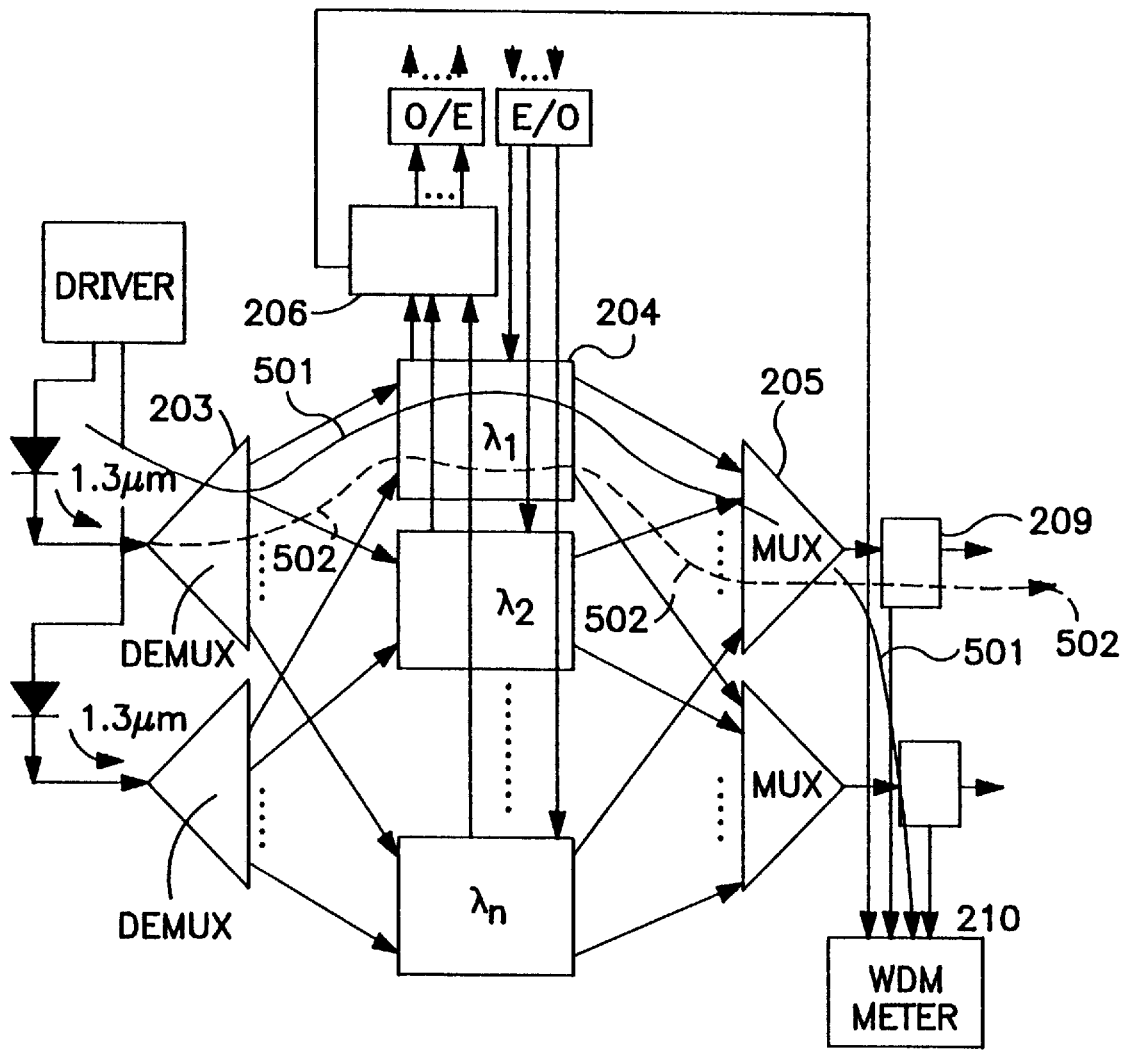
FIG. 5 illustrates monitoring of bypass optical paths.

FIG. 5 illustrates monitoring of bypass optical paths. The bypass lightpaths, such as the one indicated by the dashed path 502, are monitored by detecting the 1.3 μm light 501 at the wavemeter 210. There are a total of 2N lightpaths in FIG. 5 which are monitored. A supervisory monitoring channel is present in each of the lightpaths. This supervisory channel for each of the lightpaths is generated at 202, as described in accordance with embodiment shown in FIG. 2. The 2N supervisory channels are combined by the two wavelength multiplexers and monitored by the wavelength meters. The presence of such a supervisory channel on the wavelength meter indicates that the corresponding lightpath is connected. The missing of any one or more of the wavelengths indicate the malfunction of the lightpaths. Note that this method might not be able to locate the specific switch element that is malfunctioned. As an example, the missing of the supervisory channel 501 for the lightpath 502 could indicate the malfunction of the wavelength demux, or one of the switch components in the switch module responsible for λ1, or the wavelength multiplexer. The capability to detect the exact location within a switch module, however, is less important as the whole switch module usually needs to be replaced and repaired as a single entity.

Dropped Lightpaths

Figure 6:
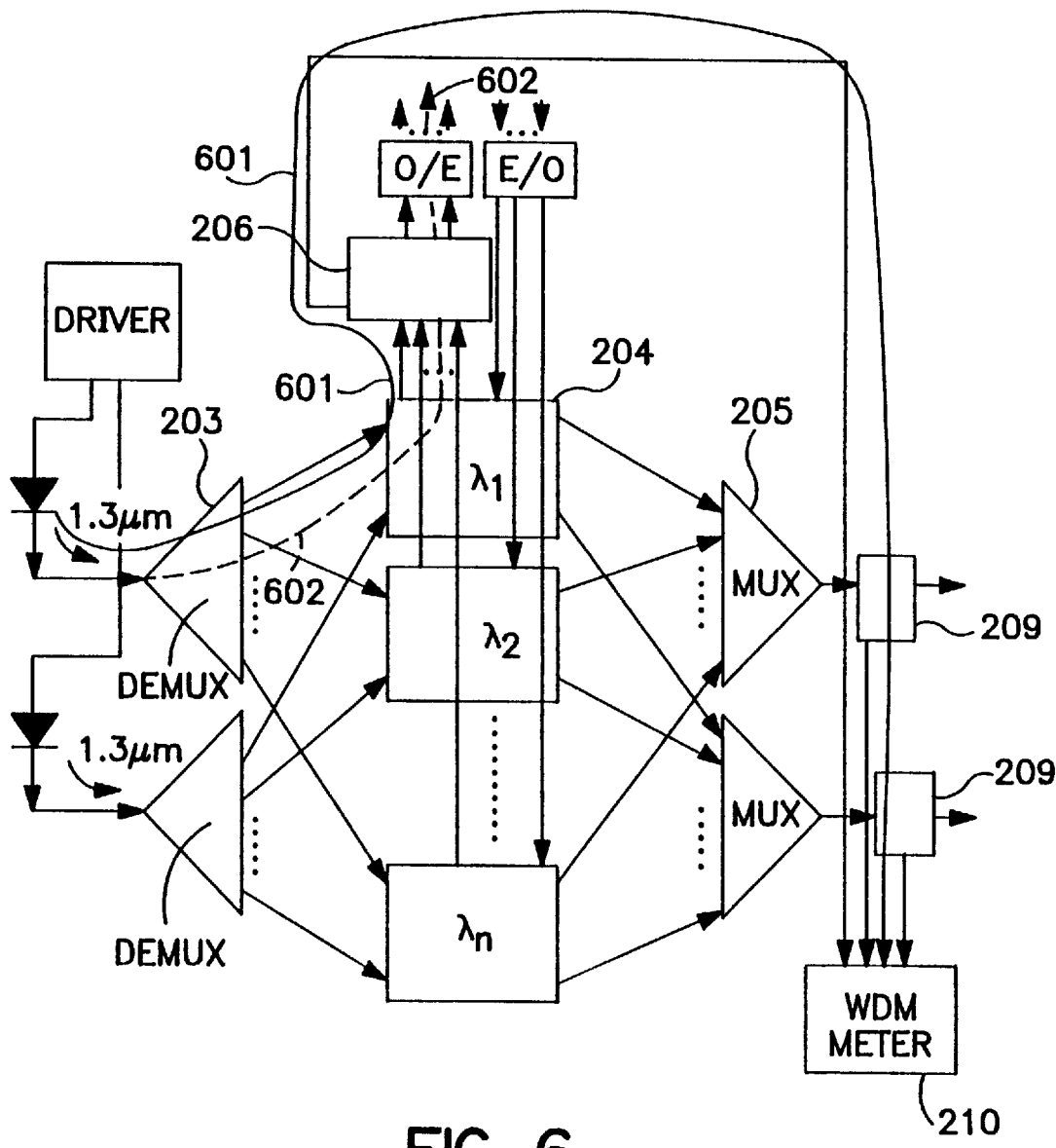
FIG. 6 illustrates monitoring of dropped optical paths.

FIG. 6 illustrates monitoring of dropped optical paths. Monitoring of the dropped lightpaths is also accomplished by monitoring the 1.3 μm signals at the wavemeter 210. If the supervisory channel 601 is dropped, this indicates that the monitored lightpath, shown by dashed line 602, is dropped as well. The supervisory channels from dropped channels are demultiplexed from the 1.5 μm signals using the Wavelength Division Multiplex splitter/combiner 206, which demultiplexes 1.3 μm optical signals from the 1.5 μm optical signals and recombines all of the 1.3 μm signals, as shown in FIG. 3. The demultiplexing between 1.3 μm and 1.55 μm is necessary in order to avoid interference at the receiver. The demultiplexed signals at 1.3 μm from each dropped channel are then combined and provided to the wavemeter. If the 1.3 μm wavelength supervisory signal is missing from the dropped channel, as measured by the wavemeter, this indicates a malfunction of the associated switch module or the wavelength demultiplexer for that dropped channel. In practice, switch modules are the most likely point of failure, compared to other passive devices such as the wavelength demultiplexers 203.

Added Lightpaths

Figure 7:
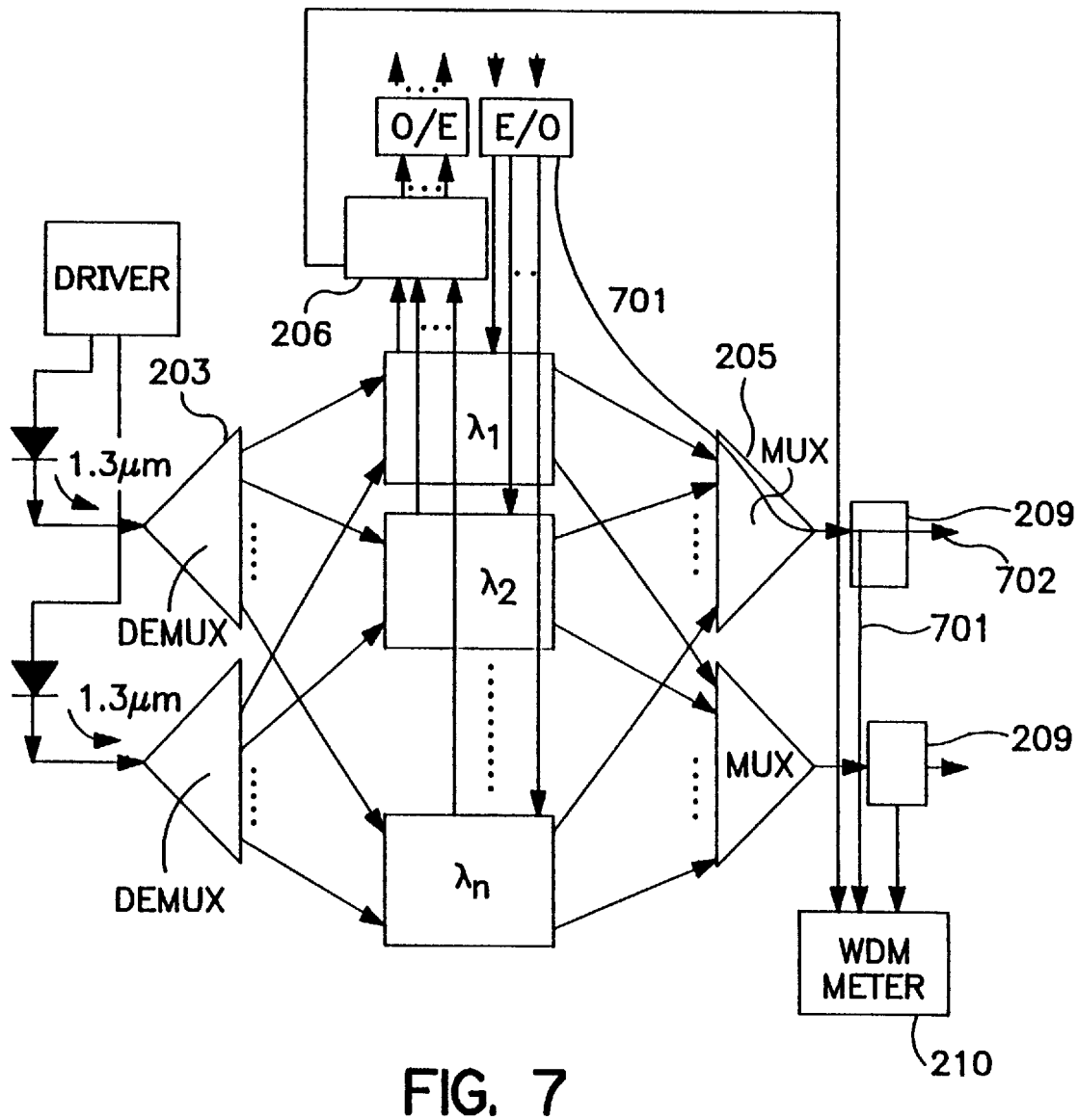
FIG. 7 illustrates monitoring of added optical paths.

FIG. 7 illustrates monitoring of added optical paths. Monitoring of the added lightpaths is accomplished by monitoring the 1.5 μm signals at the wavemeter 210. An example of the added lightpath 701 is shown. Note that monitoring of the added lightpath does not rely on the supervisory channel, but instead, the added signal itself at 1.55 μm is used for the monitoring process. The monitoring is accomplished by using the structure shown in FIG. 4 which taps off a portion 702 of the signals at 1.55 μm. If the portion of the 1.55 μm signal corresponding to the wavelengths from the added channels is missing, this absence indicates a malfunction of the associated switch module 204 or the wavelength multiplexer 205.

Figure 8:
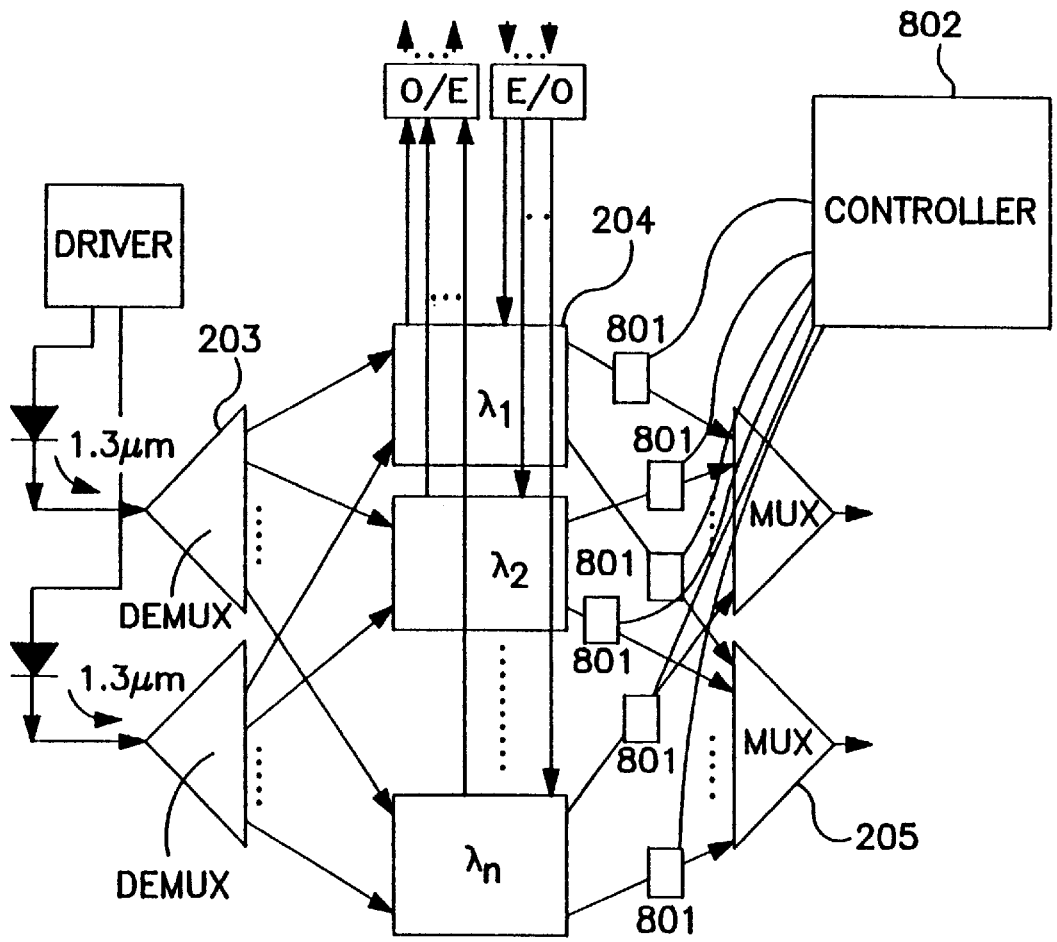
FIG. 8 illustrates an alternative embodiment of the present invention in which the wavelengths are monitored before they are combined by the wavelength multiplexer.

FIG. 8 illustrates an alternative embodiment of the present invention in which the wavelengths are monitored before they are combined by the wavelength multiplexer, instead of using the wavelength meter 210 to monitor the supervisory signal channel after the wavelength demultiplexer. In this case, a 1.3/1.55 μm splitter 801 is used at each wavelength path to divert the supervisory channel at 1.3 μm and a portion of the signal at 1.55 μm to a Controller 802, which may be part of the System Control Unit 220. This Controller 802 can then detect the presence and absence of each individual supervisory channel. Similar to the approach shown in FIG. 2, this approach does not isolate the exact location of the fault. Instead, it isolates the fault of a lightpath. When a malfunction in a lightpath is detected, the module (or modules) which can cause the malfunction is identified and repaired/replaced as necessary.

Figure 9:
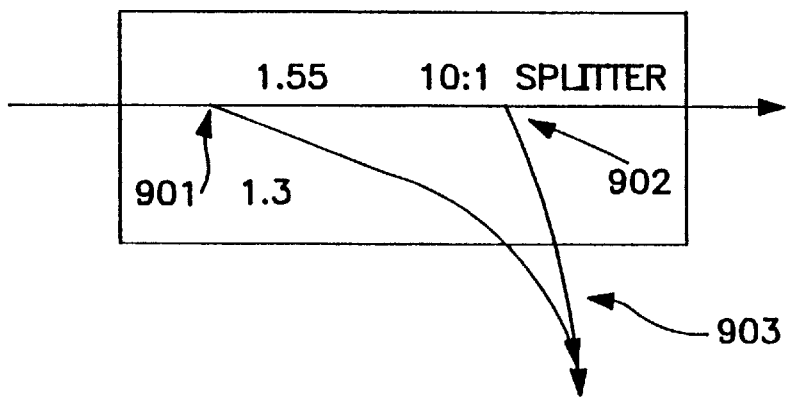
FIG. 9 illustrates the wavelength demultiplexer of FIG. 8 which demultiplexes all of the 1.3 mm optical signals and splits off a portion of the 1.5 mm optical signals.

FIG. 9 illustrates the splitter 801 of FIG. 8 which demultiplexes all of the 1.3 μm optical signals and splits off a portion of the 1.55 μm optical signals. In accordance with one embodiment of the present invention, the splitter 901 separates the 1.3 μm signals from the 1.55 μm signals, and then recombines the 1.3 μm signals with the signals tapped off from the splitter 902 at optical combiner 903. The splitter 902 is optional.

Figure 10:
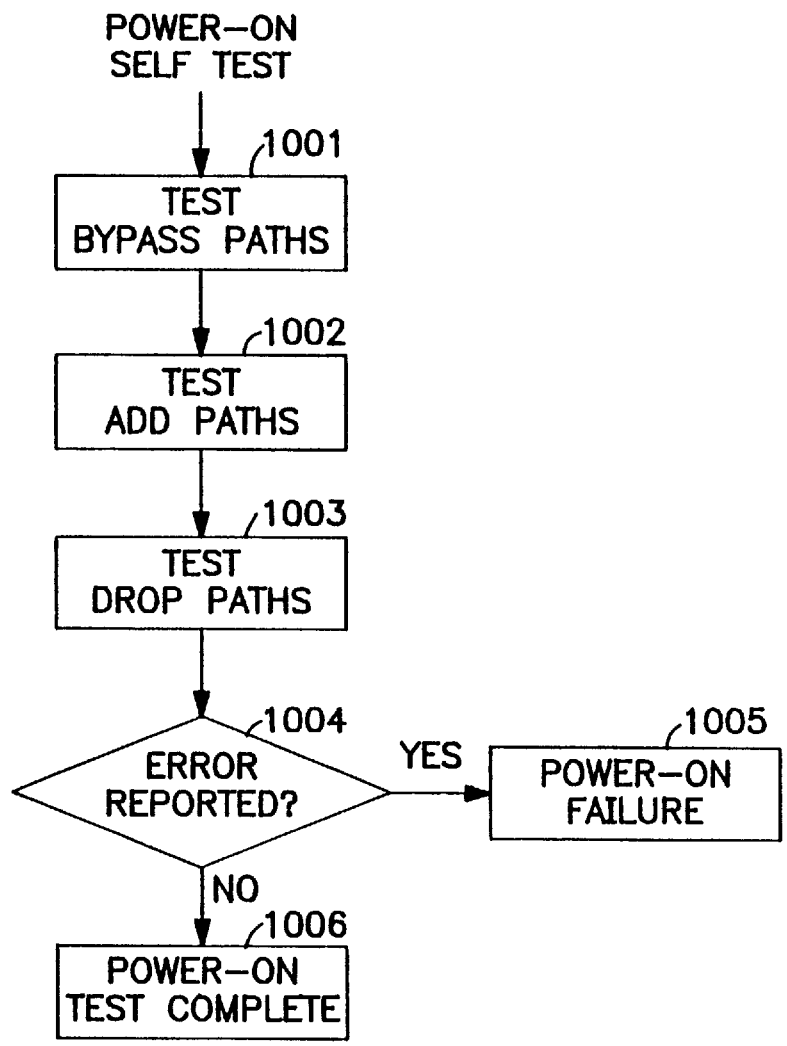
FIG. 10 is a flowchart illustrating the power-on testing procedure.

FIG. 10 is a flowchart showing an initial power-on testing procedure in accordance with the present invention when the network node's multiplexers, demultiplexers, and switch are configured, or when the monitoring system of the present invention is first started. After the system is powered on, the System Control Unit 220 examine the status of the bypass lightpaths at step 1001, examines the status of the added lightpaths at step 1002 and then examines the status of the dropped lightpaths at step 1003. The System Control Unit 220 checks whether there are any abnormal conditions reported at the end of these probing at step 1004. If all of the lightpaths are operating the test is completed at step 1006. If there are errors reported, the power-on procedure fails and the errors are reported on the system console at step 1005.

Figure 11:
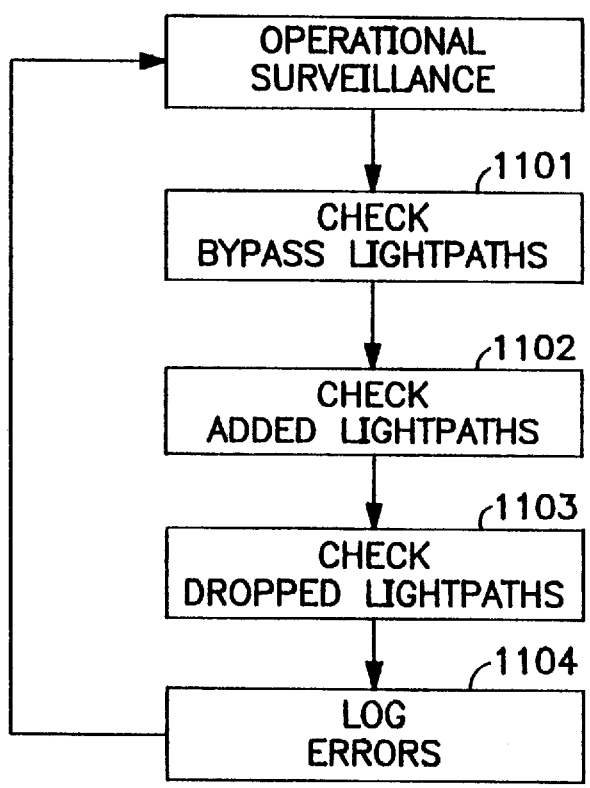
FIG. 11 is a flowchart illustrating the monitoring procedure when the optical add-drop multiplexer becomes operational.

FIG. 11 is a flowchart showing a monitoring process in accordance with the present invention. The monitoring process takes place while the network node's multiplexers, demultiplexers, and switch are in operation, called operational mode. During operational mode, the System Control Unit 220 continuously monitors the status of the bypass lightpaths at step 1101, the status of the added lightpaths at step 1102, and the status of the dropped lightpaths at step 1103. If there are any error reported during the monitoring process, the abnormal lightpaths are logged and reported to the system console at step 1104 so that the system operator can intervene.

The system need not be shut down due to single failures because the affected lightpaths can be rerouted. Depending on the network configuration, such as that shown in FIG. 1, several rerouting strategies can be used, as are well known in the art. In one common strategy, the lightpaths can be rerouted through a different wavelength providing that there exists a wavelength converter in the upper optical WDM signal. With respect to the present invention, rerouting after the wavelength converter causes the lightpath to pass through a different physical connection of the add-drop multiplexer which is functional. A second rerouting strategy reroutes the lightpaths back to the opposite direction if a counter-rotating ring exists. These lightpaths are restored once the abnormal module is repaired and restored.

Figure 12:
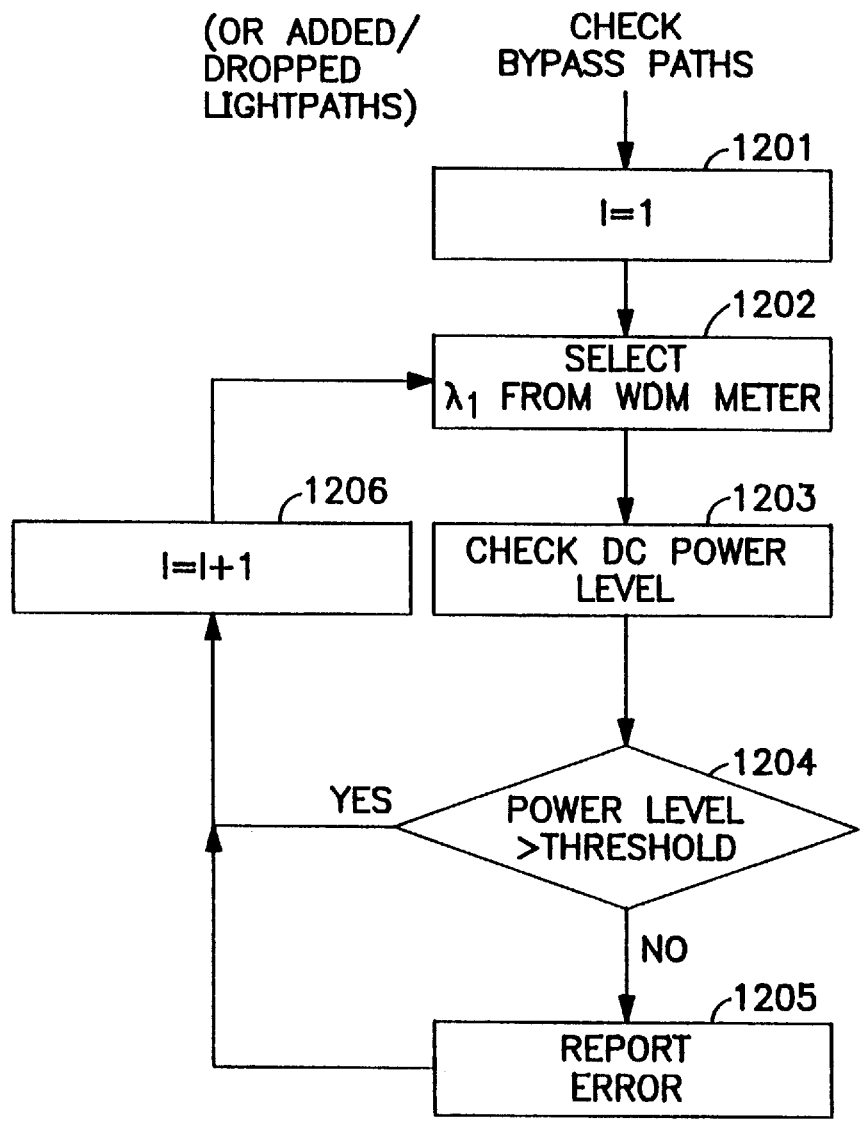
FIG. 12 is a flowchart illustrating the testing procedure for the bypass/added/dropped lightpaths during power-on mode or operational mode.

FIG. 12 is a flowchart of the process for checking a bypass/added/dropped lightpath in accordance with the present invention. The checking is performed sequentially starting with the first wavelength at step 1201. The wavelength meter is then positioned at that wavelength at step 1202. The power level of that wavelength is then measured at the wavelength meter at step 1203. If the average power is less than a certain threshold at the comparison step 1204, an error condition is reported at step 1205. The wavelength meter is then positioned at the next wavelength at step 1206, and steps 1203 to 1206 are repeated continuously. It will be obvious to one skilled in the art that although the verification process is identical at the wavelength meter, there are differences in evaluating that status of bypass/added/dropped lightpaths because of the different optical signal powers.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed:

1. A fault detecting apparatus for detecting lightpath faults within an optical transmission system which includes a plurality of lightpaths, the apparatus comprising:

means for generating a supervisory signal having a first wavelength;

combining means for combining the supervisory signal with a multiplexed optical signal;

demultiplexing means for demultiplexing the multiplexed optical signal into a plurality of optical channel signals, each having a respective wavelength and containing a portion of the supervisory signal, the first wavelength being different from each wavelength of the plurality of optical channel signals;

switching means for receiving the plurality of optical channel signals and for selectively providing ones of the plurality of optical channel signals;

multiplexing means for receiving and for multiplexing each of the selectively provided optical signals into an output multiplexed optical signal;

splitting means for separating each portion of the supervisory signal from the output multiplexed optical signal; and monitoring means for monitoring the output multiplexed optical signal for each of the lightpaths to verify that each portion of the supervisory signal is present.

2. The fault detecting apparatus as recited in claim 1, wherein absence of the portion of the supervisory signal indicates one of the faults in the optical transmission system.

3. The fault detecting apparatus as recited in claim 1, wherein the absence of the portion of the supervisory signal indicates one of the faults in a corresponding one of the plurality of lightpaths.

4. The fault detecting apparatus as recited in claim 1, further comprising:

dropping means for locally receiving at least one of the selectively provided optical channel signals from the switching means, and for separating the portion of the supervisory signal for each locally received selectively provided optical channel signals, wherein the monitoring means also monitors the portion of the supervisory signal contained in each locally received selectively provided optical channel signal.

5. The fault detecting apparatus as recited in claim 1, further comprising:

adding means for adding at least one locally generated optical channel signal to the selectively provided optical channel signals by providing the at least one locally generated optical channel to the switching means; and added signal detection means for isolating and detecting a portion of each locally generated optical channel signal;

wherein the monitoring means also monitors the detection of the portion of each locally generated optical channel signal.

6. The fault detecting apparatus as recited in claim 5, wherein the absence of the detected portion of the corresponding locally generated optical channel signal indicates a fault in the optical transmission system.

7. The fault detecting apparatus as recited in claim 1, wherein the monitoring means detects the absence of the portion of the supervisory signal and identifies a fault contained in one of the demultiplexing means, switching means and multiplexing means.

8. The fault detecting apparatus as recited in claim 1, wherein the combining means uses wavelength splicing to perform the combining of the supervisory signal with the multiplexed optical signal.

9. The fault detecting apparatus as recited in claim 1, wherein the first wavelength is substantially 1.3 $\mu$m.

10. The fault detecting apparatus as recited in claim 1, wherein the monitoring means includes a wavelength meter to measure a power level of each portion.

11. A method of detecting lightpath faults within an optical transmission system which includes a plurality of lightpaths, the method comprising the steps of:

a) generating a supervisory signal having a first wavelength;

b) combining the supervisory signal with a multiplexed optical signal;

c) demultiplexing the multiplexed optical signal into a plurality of optical channel signals, each having a respective wavelength and containing a portion of the supervisory signal, the first wavelength being different from each wavelength of the plurality of optical channel signals;

d) multiplexing each of the plurality of optical signals into an output multiplexed optical signal;

e) separating each portion of the supervisory signal from the output multiplexed optical signal; and f) monitoring the output multiplexed optical signal for each of the lightpaths to verify that each portion of the supervisory signal is present.

12. The method of fault detection as recited in claim 11, wherein absence of the portion of the supervisory signal indicates one of the faults in the optical transmission system.

13. The method of fault detection as recited in claim 11, wherein absence of the portion of the supervisory signal indicates one of the faults in a corresponding one of the plurality of lightpaths.

14. The method of detecting lightpath faults as recited in claim 11, further comprising the steps:

g) locally receiving at least one of the plurality of optical channel signals from the switching means;

h) separating the portion of the supervisory signal for each locally received optical channel signal;

wherein the monitoring step f) also monitors the portion of the supervisory signal contained in each locally received optical channel signal.

15. The method of detecting lightpath faults as recited in claim 11, further comprising:
   i) adding at least one locally generated optical channel signal to the plurality of optical channel signals; and
   j) isolating and detecting a portion of each locally generated optical channel signal; and
   the monitoring step f) also monitors the detection of the portion of each locally generated optical channel signal.

16. The method of detecting lightpath faults as recited in claim 15, wherein the absence of the detected portion of the corresponding locally generated optical channel signal indicates a fault in the optical transmission system.

17. The method of detecting lightpath faults as recited in claim 11, wherein the monitoring step f) further comprises the steps of:

f)(1) detecting the absence of the portion of the supervisory signal; and f)(2) identifying a fault contained in one of the demultiplexing means, switching means and multiplexing means.

18. The method of detecting lightpath faults as recited in claim 11, wherein the combining step b) uses wavelength splicing to perform the combining of the supervisory signal with the multiplexed optical signal.

19. The method of detecting lightpath faults as recited in claim 11, wherein the first wavelength is substantially 1.3 $\mu$m.

20. The method of detecting lightpath faults as recited in claim 11, wherein the monitoring step employs a wavelength meter to measure a power level of each portion.

* * * * *